United States Patent
Guggilla et al.

(10) Patent No.: US 10,255,349 B2
(45) Date of Patent: Apr. 9, 2019

(54) REQUESTING ENRICHMENT FOR DOCUMENT CORPORA

(71) Applicant: International Business Machines Corporation, Armonk, NY (US)

(72) Inventors: Chinnappa Guggilla, Bangalore (IN); Krishna Kummamuru, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 390 days.

(21) Appl. No.: 14/923,466

(22) Filed: Oct. 27, 2015

(65) Prior Publication Data

US 2017/0116317 A1    Apr. 27, 2017

(51) Int. Cl.
    *G06F 17/30* (2006.01)

(52) U.S. Cl.
    CPC .. *G06F 17/30654* (2013.01); *G06F 17/30598* (2013.01); *G06F 17/30604* (2013.01)

(58) Field of Classification Search
    CPC ........... G06F 17/30598; G06F 17/3053; G06F 17/30604
    See application file for complete search history.

(56) References Cited

U.S. PATENT DOCUMENTS

| | | | |
|---|---|---|---|
| 7,555,472 B2 | 6/2009 | Craig et al. | |
| 8,239,413 B2 | 8/2012 | Hubert | |
| 8,463,648 B1 * | 6/2013 | Bierner | G06Q 30/02 705/14.44 |
| 9,298,816 B2 | 3/2016 | Dimassimo et al. | |
| 2007/0016545 A1 | 1/2007 | Broder et al. | |
| 2011/0218947 A1 * | 9/2011 | Vadlamani | G06F 15/18 706/12 |
| 2012/0077187 A1 | 3/2012 | Noordin et al. | |
| 2012/0078895 A1 | 3/2012 | Chu-Carroll et al. | |
| 2013/0017523 A1 | 1/2013 | Barborak et al. | |
| 2014/0057241 A1 | 2/2014 | Rapp et al. | |
| 2014/0072947 A1 | 3/2014 | Boguraev et al. | |
| 2014/0120513 A1 | 5/2014 | Jenkins et al. | |
| 2015/0142418 A1 | 5/2015 | Byron et al. | |
| 2016/0019462 A1 | 1/2016 | Allen et al. | |
| 2017/0132314 A1 * | 5/2017 | Liu | G06F 17/30687 |

* cited by examiner

*Primary Examiner* — Alexander Khong
(74) *Attorney, Agent, or Firm* — Christopher K. McLane; Steven Fisher-Stawinski

(57) ABSTRACT

A computer-implemented method includes receiving a question set. The question set is for a question answer system. The method receives a plurality of domain cluster topics. The plurality of domain cluster topics are for the question set. The method organizes the question set based on the plurality of domain cluster topics to yield a plurality of question set topics. The method receives a document corpus. The document corpus is for the question answer system. The method organizes the document corpus based on the plurality of domain cluster topics to yield a plurality of document corpus topics. The method maps the plurality of question set topics to the plurality of document corpus topics. The method determines whether any of the plurality of question set topics are unmatched. The method is responsive to any of the plurality of question set topics being unmatched. The method requests enrichment for the document corpus.

17 Claims, 5 Drawing Sheets

REQUESTING ENRICHMENT FOR DOCUMENT CORPORA

BACKGROUND

The present invention relates generally to the field of question answer systems, and more particularly to document corpora for question answer systems.

Question answering is a form of information retrieval and natural language processing. Question answering systems automatically answer questions posed by humans in a natural language. Question answering systems may be closed-domain, where the question answering system answers or attempts to answer questions under a specific domain, or topic, such as medicine or baseball. Alternatively, question answering system may be open-domain, where the question answering system answers or attempts to answer questions dealing with any topic. Question answering systems may answer questions by accessing structured and unstructured collections of natural language documents, known as a document corpus. Computer programmers continue to face difficulties when building document corpora and determining if the document corpus for any question answering system is sufficient.

SUMMARY

A computer-implemented method includes receiving a question set. The question set is for a question answer system. The method receives a plurality of domain cluster topics. The plurality of domain cluster topics are for the question set. The method organizes the question set based on the plurality of domain cluster topics to yield a plurality of question set topics. The method receives a document corpus. The document corpus is for the question answer system. The method organizes the document corpus based on the plurality of domain cluster topics to yield a plurality of document corpus topics. The method maps the plurality of question set topics to the plurality of document corpus topics. The method determines whether any of the plurality of question set topics are unmatched. The method is responsive to any of the plurality of question set topics being unmatched. The method requests enrichment for the document corpus. A corresponding computer program product and computer system are also disclosed.

DETAILED DESCRIPTION

Figure 1:
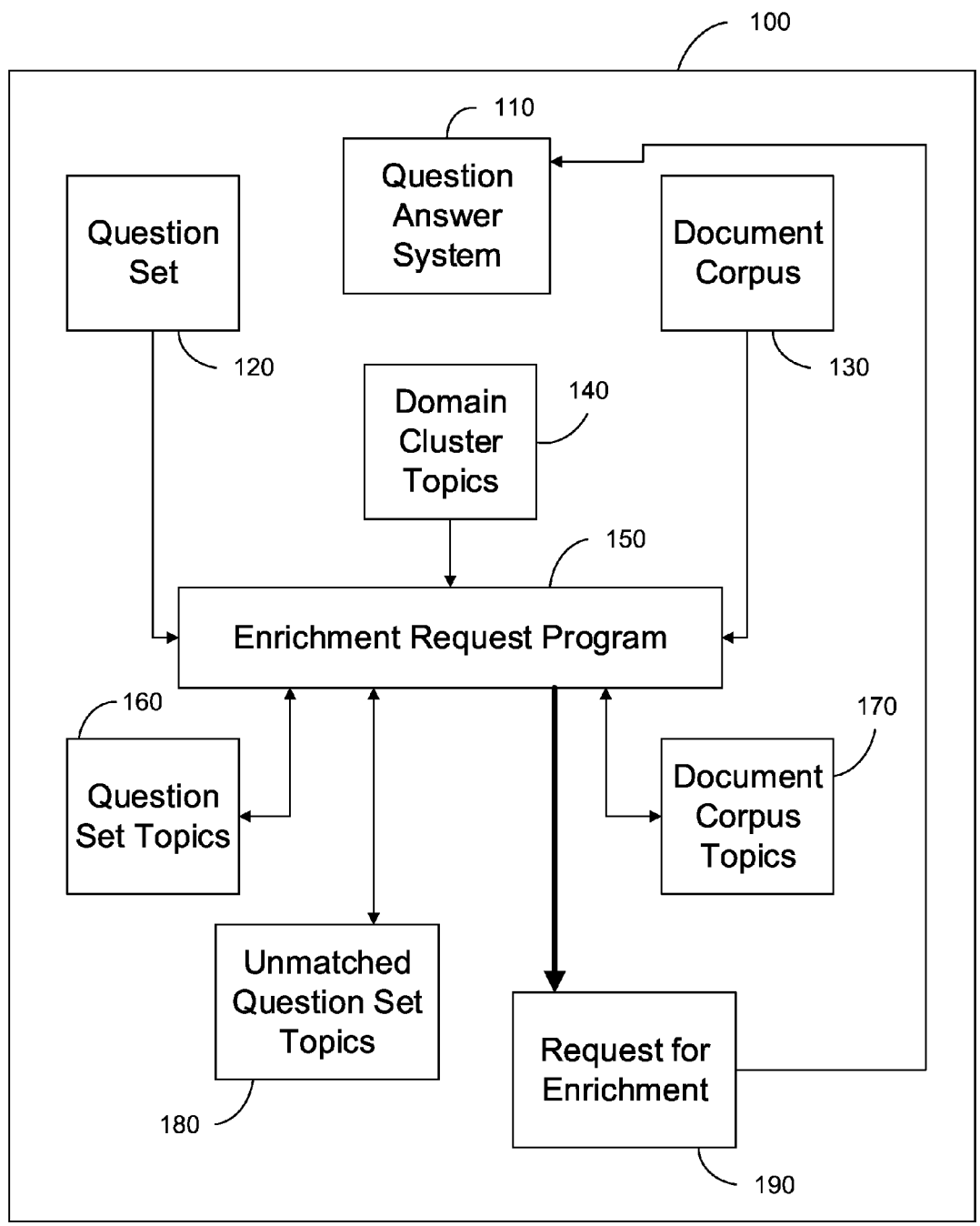
FIG. 1 is a block diagram of a computing environment suitable for operation of an enrichment request program, in accordance with at least one embodiment of the present invention.

Referring now to the invention in more detail, FIG. 1 is a block diagram displaying an exemplary computing environment suitable for operation of at least one embodiment of the invention. A computing environment 100 includes a question answer system 110, a question set 120, a document corpus 130, domain cluster topics 140, an enrichment request program 150, question set topics 160, document corpus topics 170, unmatched question set topics 180, and a request for enrichment 190, all in mutual communication and interconnected via the computing environment 100. The computing environment 100 may be a cloud-based, virtual, or distributed environment or a remote environment on defined server hardware, or, more generally, the computing environment 100 may be any type of environment suitable for access by the question answer system 110 of the enrichment request program 150.

The enrichment request program 150 may generate the question set topics 160, the document corpus topics 170, and the unmatched question set topics 180 as intermediate output. The enrichment request program 150 may generate the request for enrichment 190 as output for the question answer system 110. The enrichment request program 150 may receive the question set 120, the document corpus 130, and the domain cluster topics 140 as input. The enrichment request program 150 may use the question set topics 160, the document corpus topics 170, and the unmatched question set topics 180 as input. In some embodiments, the enrichment request program 150 may receive the question set 120, the domain cluster topics 140, or the document corpus 130 from the question answer system 110.

The question answer system 110 is a system for automatically answering questions posed by humans in a natural language. In some embodiments, the question answer system 110 is IBM® Watson®. In some embodiments, the question answer system 110 is a general purpose question answering system.

The question set 120 is a plurality of questions written in natural language. The question answer system 110 may generate answers for the plurality of questions within the question set 120. The question set 120 may be generated by a human user (not shown) or be generated as output by the question answer system 110. In some embodiments the question set 120 is generated by IBM® Watson®. In some embodiments, the question set 120 relates to a particular domain. For example, the question set 120 may be questions a human user anticipates may be asked on an examination.

The document corpus 130 is a structured database of knowledge, an unstructured collection of natural language documents, or a combination. The question answer system 110 may answers questions, such as the questions within the question set 120, by analyzing and/or searching the document corpus 130. The document corpus 130 may be, for example, a collection of reference texts, a collection of news reports, or a collection of internet web pages. The document corpus 130 may be stored within the question answer system 110. The document corpus 130 may be stored externally as long as the question answer system 110 may access the document corpus 130.

The domain cluster topics 140 are categories into which the elements within the document corpus 130 and elements within the question set 120 may be categorized. For example, the question set 120 may be a collection of questions the human user anticipates will be asked on a history examination. In such an embodiment, the domain cluster topics 140 may be each year that will be tested or each country that will be tested. In some embodiments, the domain cluster topics 140 are generated by a human user or are generated as output by the question answer system 110. In some embodiments, the domain cluster topics 140 are generated by IBM® Watson®.

In some embodiments, the domain cluster topics 140 are and/or include a domain topic hierarchy. Domain topic hierarchy is a manifestation of knowledge about the domain. Domain topic hierarchy builds topics and a conceptual hierarchy based on conceptual relationships. For example, domain topic hierarchy may include that a credit card is a type of card, a method of payment, and/or an item in a wallet.

The question set topics 160 are a subset of the domain cluster topics 140 that correspond to the questions within the question set 120. For example, a question set 120 may be questions about 18th century Japan. The domain cluster topics 140 may be each year of the 18th century (1700-1799), meaning the domain cluster topics 140 has one hundred elements. In such an example, the question set 120 may include questions about years 1700, 1750, and 1796. In such an example, the question set topics has three elements: the years 1700, 1750, and 1796.

The document corpus topics 170 are a subset of the domain cluster topics 140 that correspond to the document corpus 130. For the previous example, the document corpus 130 may be a collection of internet web pages that reference the years 1700, 1714, and 1796. In such an example, the document corpus topics 170 has three elements: the years 1700, 1714 and 1796.

The unmatched question set topics 180 are a subset of the domain cluster topics 140 that correspond to differences between the question set topics 160 and the document corpus topics 170. For the previous example, the question set topics 160 has the elements year 1700, year 1750, and year 1796. The document corpus topics 170 has the elements years 1700, year 1714, and year 1796. In such an example, the question set topics 160 and the document corpus topics 170 do not both include the year 1750 and 1714. In some embodiments, the unmatched question set topics 180 are the elements within the question set topics 160 that are not within the document corpus topics 170. In such an embodiment, the unmatched question set topics 180 is the element the year 1750. In other embodiments, the unmatched question set topics 180 are the elements within the question set topics 160 that are not within the document corpus topics 170 and the elements within the document corpus topics 170 that are not within the question set topics 160. In such an embodiment, the unmatched question set topics 180 is the elements the year 1750 and the year 1714.

The enrichment request program 150 receives as input the question set 120, the document corpus 130, and the domain cluster topics 140. The enrichment request program 150 may generate the question set topics 160, the document corpus topics 170, and the unmatched question set topics 180 as intermediate output. The enrichment request program may use the question set 120, the document corpus 130, the domain cluster topics 140, the question set topics 160, the document corpus topics 170, and the unmatched question set topics 180 to generate the request for enrichment 190 as output. The enrichment request program may be a dedicated enrichment request program, a function integrated within another program, or any program or function that can communicate with the question set 120, the document corpus 130, the domain cluster topics 140, the question answer system 110 via the computing environment 100.

Figure 2:
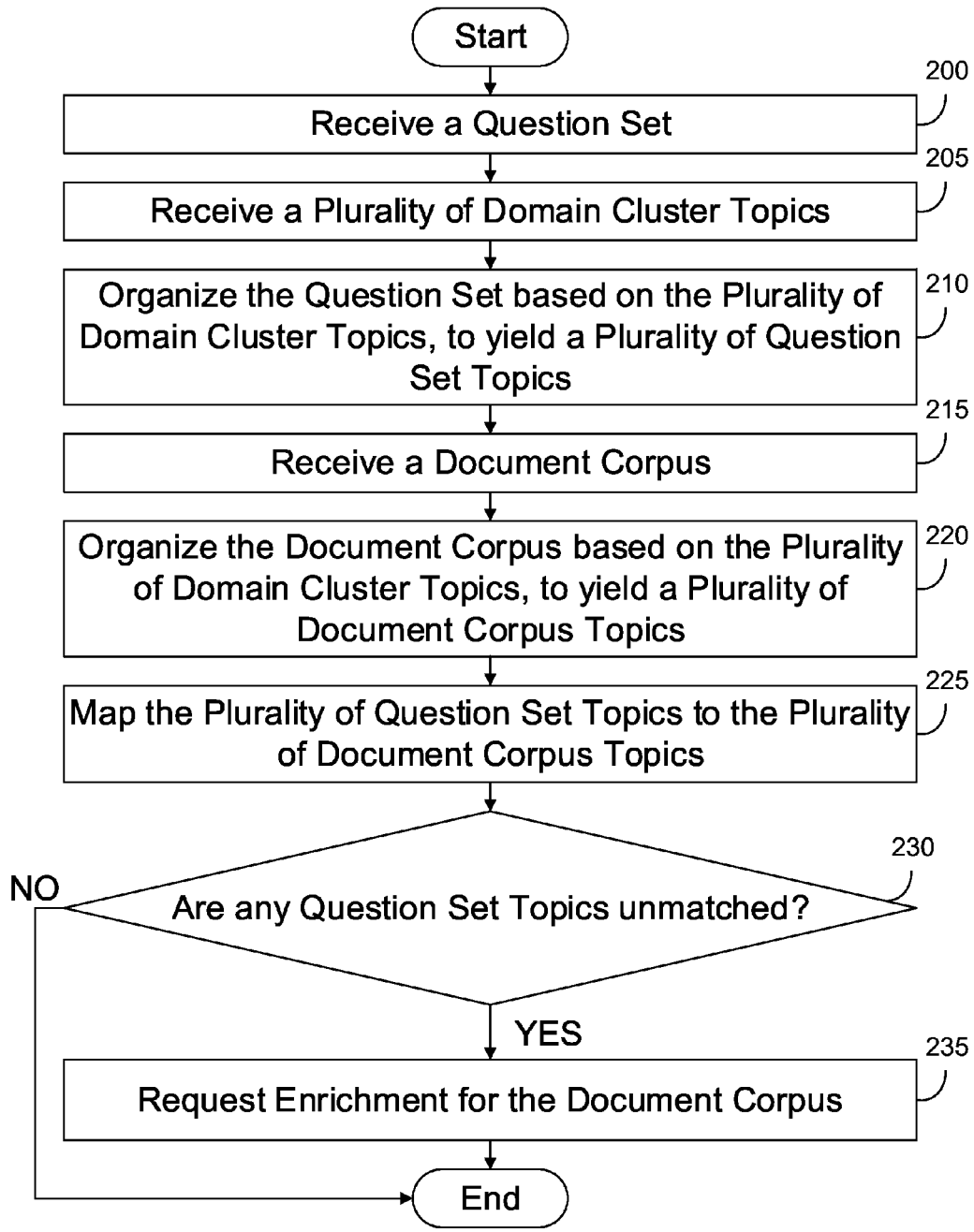
FIG. 2 is flowchart depicting operational steps for an enrichment request program, in accordance with at least one embodiment of the present invention.

FIG. 2 is a flowchart depicting the operational steps of the enrichment request program 150, executing within the computing environment 100 of FIG. 1, in accordance with an embodiment of the present invention.

At step 200, the enrichment request program 150 receives the question set 120. The question set 120 includes a collection of questions that may be asked within the question answer system 110. Receiving may include a user explicitly calling the enrichment request program 150 from a command line interface using a reference to the question set 120 as an argument. Alternatively, receiving may include automated calls to the enrichment request program 150, for example, from an integrated development environment or as part of an enrichment request management system.

In some embodiments, the question answer system 110 accesses an information retrieval system or application. In some embodiments, the information retrieval system or application is a web search engine. In some embodiments, the enrichment request program 150 will respond to receiving a question set by implementing the information retrieval system. In some embodiments the question answer system 110 accesses the information retrieval system responsive to the enrichment request program 150 receiving the question set 120. In such an embodiment, the enrichment request program 150 may indicate or notify or push a notification to the question answer system 110 to indicate that the enrichment request program 150 has received the question set 120. Implementing the information retrieval system may include the question answer system 110 sending, inputting, or forwarding the question set 120 to the information retrieval system.

In such an embodiment, the information retrieval system may generate a second question set. The second question set may questions that are related to questions within the question set 120. In some embodiments, the information retrieval system is a function of IBM® Watson® and the second set of questions are generated by IBM® Watson®. In such embodiments, the enrichment request program 150 may receive the second set of questions after and/or responsive to the information retrieval system being implemented. The enrichment request program 150 may update the set of unmatched question set topics to include questions within the second set of questions that are not matched with an element from the document corpus topics 170. The enrichment request program may act by updating the set of unmatched question set topics.

At step 205, the enrichment request program 150 receives the domain cluster topics 140. The domain cluster topics 140 are a plurality of domain cluster topics.

At step 210, the enrichment request program 150 organizes the question set 120 based on the domain cluster topics 140 to yield the question set topics 160. Organizing may include the enrichment request program 150 performing keyword searches or keyword and related keyword searches where the question set 120 is searched and keywords are the domain cluster topics 140.

At step 215, the enrichment request program 150 receives the document corpus 130.

At step 220, the enrichment request program 150 organizes the document corpus 130 based on the domain cluster topics 140 to yield the document corpus topics 170. In embodiments where the document corpus 130 is structured organizing may include a segment scan or an index scan.

At step 225, the enrichment request program 150 maps the plurality of question set topics to the plurality of document corpus topics. The enrichment request program 150 may map the plurality of question set topics to the plurality of document corpus topics. Mapping relates elements from the plurality of question set topics to the plurality of document corpus topics. The enrichment request program 150 may search the document corpus topics 170 to determine if the document corpus topics 170 includes at least every element within the question set topics 160 and/or vice versa. In some embodiments, mapping may include a segment scan or an index scan.

At step 230, the enrichment request program 150 determines if any elements within the question set topics 160 are unmatched after mapping the plurality of question set topics to the plurality of document corpus topics. If, yes, there are unmatched question set topics, the enrichment request program 150 proceeds to step 235. If, no, there are not unmatched question set topics, the enrichment request program 150 may exit. In some embodiments, the enrichment request program 150 may generate a plurality of unmatched question set topics such as the unmatched question set topics 180. The enrichment request program 150 may act by generating a plurality of unmatched question set topics.

At step 235, the enrichment request program 150 requests enrichment for the document corpus. In some embodiments, requesting enrichment includes sending an indication to the question answer system 110. In such an embodiments, the indication may include which of the question set topics 160 were unmatched. The enrichment request program 150 may push or otherwise forward the request for enrichment 190. In some embodiments, the request for enrichment 190 includes and/or references the unmatched question set topics 180.

Figure 3:
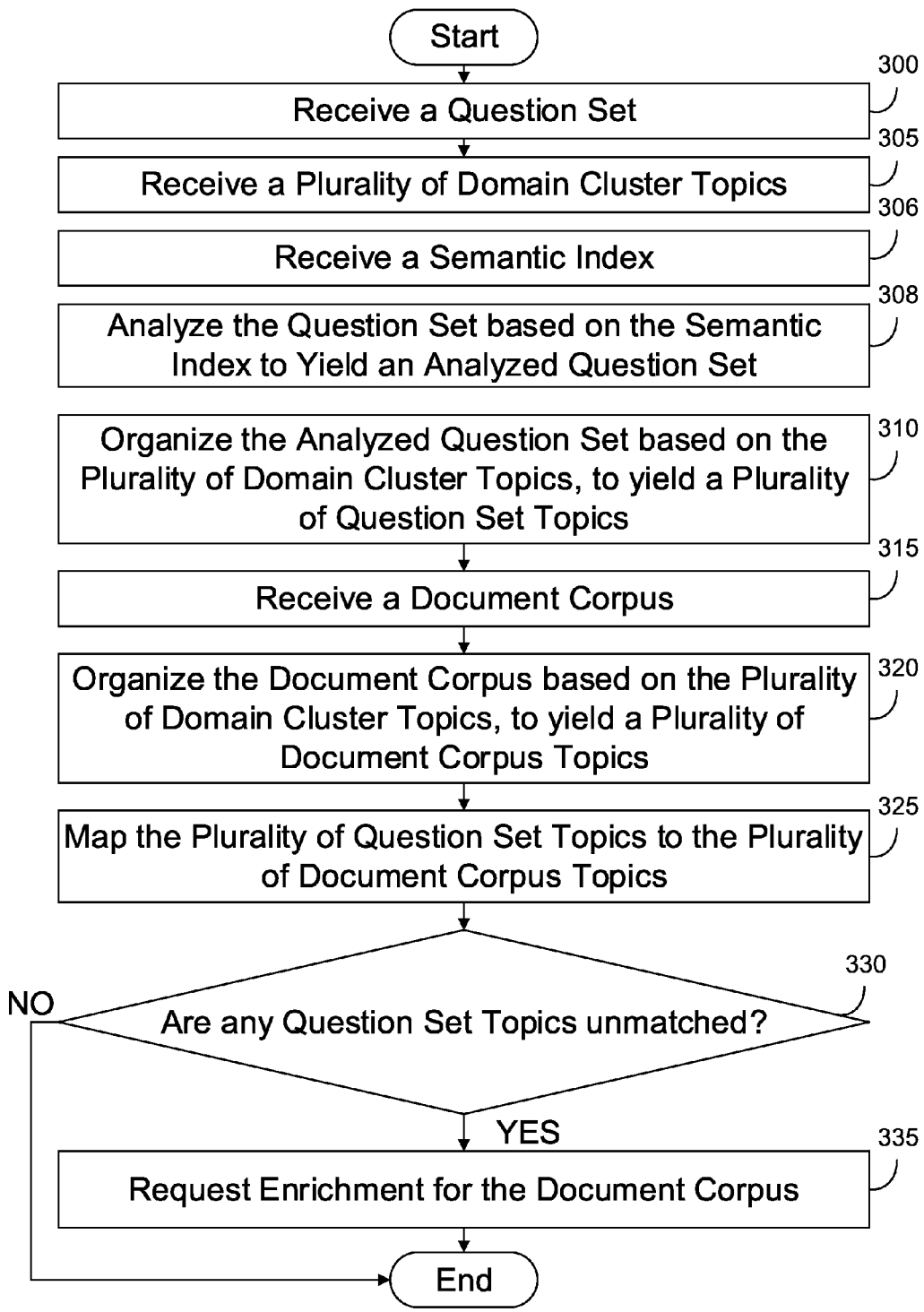
FIG. 3 is flowchart depicting operational steps for an enrichment request program using a semantic index, in accordance with at least one embodiment of the present invention.

FIG. 3 is flowchart depicting operational steps for the enrichment request program 150 executing within the computing environment of FIG. 1, in accordance with an embodiment of the present invention where the enrichment request program 150 is using a semantic index.

The enrichment request program 150 performs step 300 and step 305 in a way that is similar to the embodiment depicted in FIG. 2.

At step 306 the enrichment request program 150 receives a semantic index. The semantic index may be a part of a latent semantic indexing system. A latent semantic indexing system is an indexing and retrieval method that uses singular value decomposition to identify patterns in relationships between terms and concepts contained in an unstructured collection of text. The semantic index may be a term-document matrix.

At step 308 the enrichment request program 150 analyzes the question set based on the semantic index received at step 306 to yield an analyzed question set. Analyzing may include the enrichment request program 150 implemented the latent semantic indexing system using the received semantic index.

At step 310, the enrichment request program 150 organizes the analyzed question set based on the domain cluster topics 140 to yield a plurality of question set topics, such as the question set topics 160. Organizing may include the enrichment request program 150 performing keyword searches or keyword and related keyword searches where the question set 120 is searched and keywords are the domain cluster topics 140.

The enrichment request program 150 performs step 315, step 320, step 325, step 330, and step 335 in a way that is similar to the embodiment depicted in FIG. 2.

Figure 4:
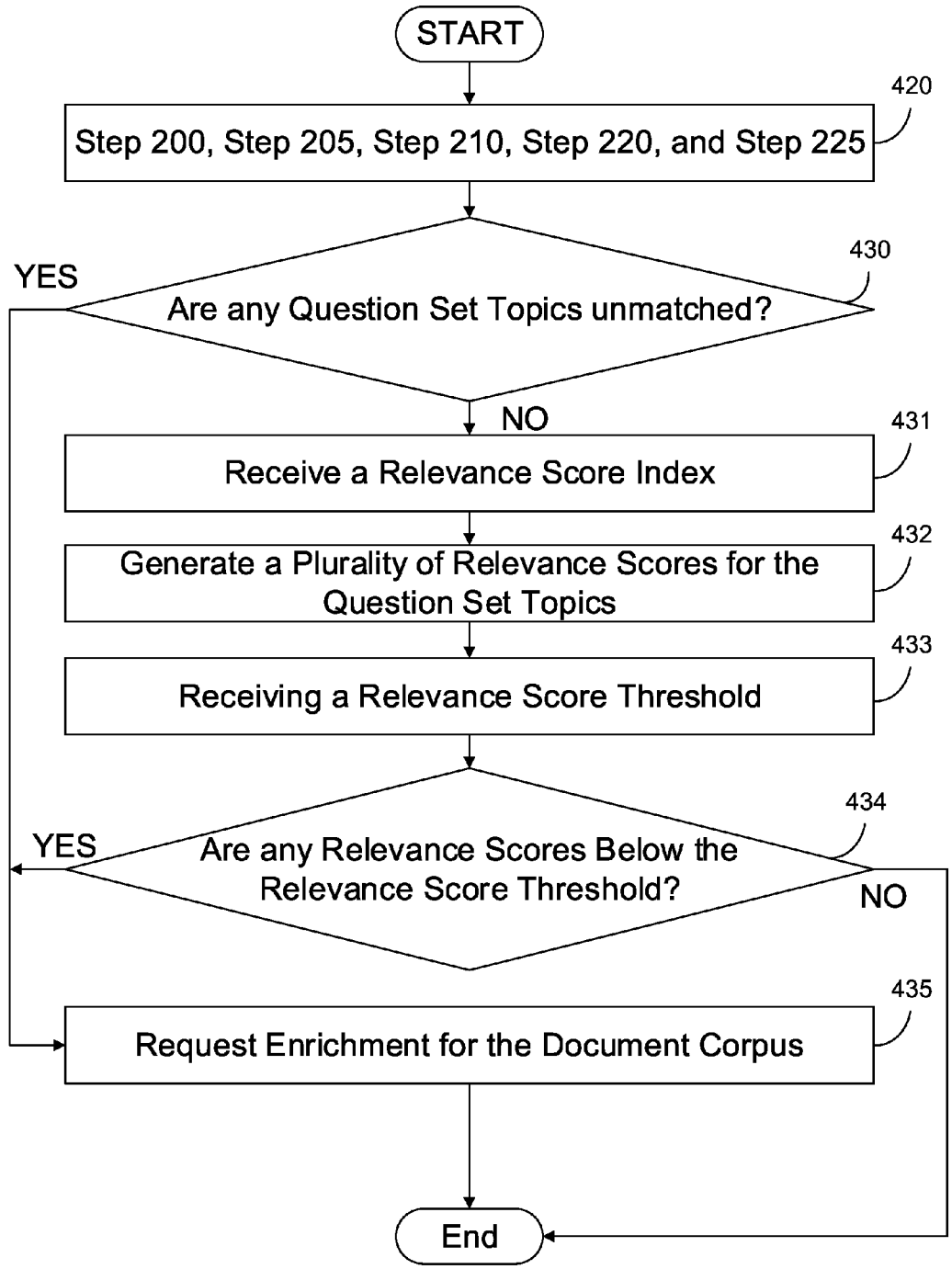
FIG. 4 is a flowchart depicting operational steps for an enrichment request program using a relevance score index, in accordance with at least one embodiment of the present invention.

FIG. 4 is a flowchart depicting operational steps for the enrichment request program 150 executing within the computing environment of FIG. 1, using a relevance score index, in accordance with at least one embodiment of the present invention.

At step 420 the enrichment request program 150 performs step 200, step 205, step 210, step 220, and step 225 in a way that is similar to the embodiment of FIG. 2.

At step 430 the enrichment request program 150 decides if there are any unmatched question set topics in a way that is similar to the embodiment of FIG. 2. If, yes, there are unmatched question set topics, the enrichment request program 150 proceeds to step 435 in a way that is similar to the embodiment of FIG. 2.

If, no, there are no unmatched question set topics, the enrichment request program 150 proceeds to step 431. At step 431 the enrichment request program receives a relevance score index. In information science and information retrieval, relevance denotes how well a retrieved document or set of documents meets the information need of the user. The enrichment request program 150 may receive the relevance score index from the question answer system 110. In some embodiments, the enrichment request program 150 receives the relevance score index from IBM® Watson®.

At step 432 the enrichment request program 150 generates a plurality of relevance scores for each of the question set topics. The enrichment request program 150 may generate a relevance score for each question set topic by comparing each element within the question set topics 160 with the corresponding element or elements within the document corpus topics 170. A relevance score may be based on a precision and/or recall evaluation algorithm.

At step 433 the enrichment request program 150 receives a relevance score threshold. The relevance score threshold may be a predetermined number or score. In some embodiments, the enrichment request program 150 receives the relevance score threshold from IBM® Watson®.

At step 434 the enrichment request program 150 determines if any relevance scores from the plurality of relevance scores generated for each of the question set topics at step 432, are below the relevance score threshold received at step 433. The enrichment request program 150 is responsive to whether or not any of the plurality of relevance scores are below the relevance score threshold. If, yes, there are relevance scores below the relevance score threshold, the enrichment request program 150 responds by determining those question set topics are unmatched and proceeds to step 435. If, no, there are not relevance scores below the relevance score threshold, the enrichment request program 150 may exit.

Figure 5:
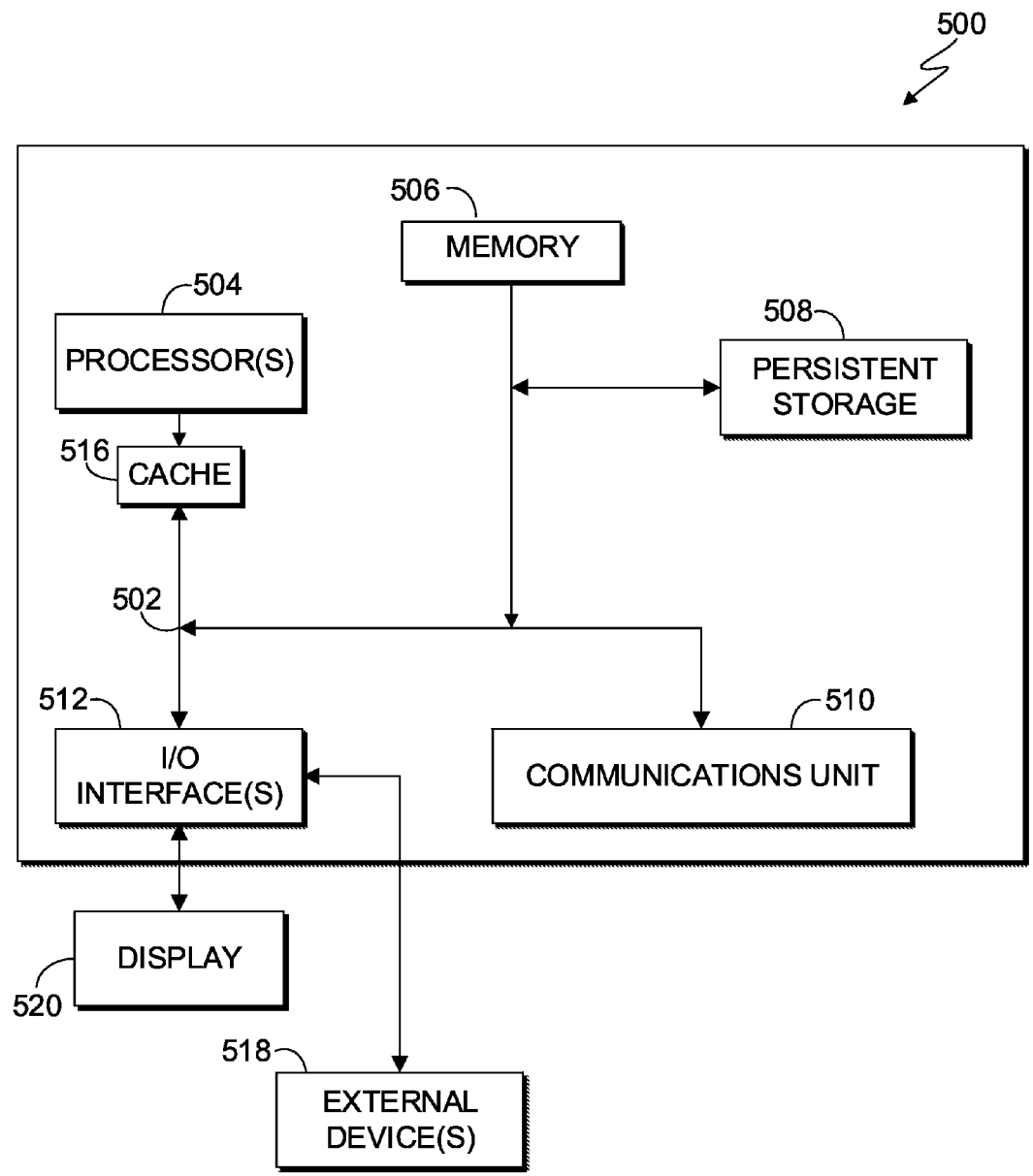
FIG. 5 is a block diagram of components of a computing apparatus suitable for executing the enrichment request program, in accordance with at least one embodiment of the present invention.

FIG. 5 is a block diagram depicting components of a computer 500 suitable for executing the enrichment request program 150. FIG. 5 displays the computer 500, the one or more computer processor(s) 504 (including one or more computer processors), the communications fabric 502, the memory 506, the RAM, the cache 516, the persistent storage 508, the communications unit 510, the I/O interface(s) 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the computer processor(s) 504 (e.g. microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the enrichment request program 150 may be stored in the persistent storage 508 or in memory 506, or more generally, any computer readable storage media, for execution by one or more of the respective computer processor(s) 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions, computer program instructions, or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The enrichment request program 150 may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface(s) 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a question set, said question set being for a question answer system;
   receiving a plurality of domain cluster topics, said plurality of domain cluster topics being for said question set;
   organizing said question set based on said plurality of domain cluster topics to yield a plurality of question set topics;
   receiving a document corpus, said document corpus being for said question answer system;
   organizing said document corpus based on said plurality of domain cluster topics to yield a plurality of document corpus topics;
   mapping said plurality of question set topics to said plurality of document corpus topics;
   determining whether any of said plurality of question set topics are unmatched to said plurality of document corpus topics; and
   responsive to any of said plurality of question set topics being unmatched to said plurality of document corpus topics, requesting enrichment for said document corpus, wherein requesting enrichment for said document corpus further comprises:
      receiving a relevance score index;
      generating a plurality of relevance scores, said plurality of relevance scores being for said plurality of question set topics;
      receiving a relevance score threshold;
      determining whether each of said plurality of relevance scores is below said relevance score threshold; and
      responsive to said any of said plurality of relevance scores being below said relevance score threshold: determining said question set topic is unmatched.

2. The computer-implemented method of claim 1, wherein organizing said question set based on said plurality of domain cluster topics to yield a plurality of question set topics comprises:
   receiving a semantic index;
   analyzing said question set based on said semantic index to yield an analyzed question set; and
   organizing said analyzed question set based on said plurality of domain cluster topics to yield a plurality of question set topics.

3. The computer-implemented method of claim 1, wherein an information retrieval system is implemented responsive to receiving said question set.

4. The computer-implemented method of claim 3, wherein requesting enrichment for said document corpus further comprises:
   receiving a second question set, said second question set being received responsive to said information retrieval system being implemented; and
   updating said set of unmatched question set topics.

5. The computer-implemented method of claim 1, wherein determining whether any of said plurality of question set topics are unmatched yields a plurality of unmatched question set topics.

6. The computer-implemented method of claim 5, wherein requesting enrichment for said document corpus is based on said plurality of unmatched question set topics.

7. A computer program product comprising:
   one or more computer readable storage media and program instructions stored on said one or more computer readable storage media, said program instructions comprising instructions to:

receive a question set, said question set being for a question answer system;
receive a plurality of domain cluster topics, said plurality of domain cluster topics being for said question set;
organize said question set based on said plurality of domain cluster topics to yield a plurality of question set topics;
receive a document corpus, said document corpus being for said question answer system;
organize said document corpus based on said plurality of domain cluster topics to yield a plurality of document corpus topics;
map said plurality of question set topics to said plurality of document corpus topics;
determine whether any of said plurality of question set topics are unmatched to said plurality of document corpus topics; and
responsive to any of said plurality of question set topics being unmatched to said plurality of document corpus topics, request enrichment for said document corpus, wherein instructions to request enrichment for said document corpus further comprises instructions to:
receive a relevance score index;
generate a plurality of relevance scores, said plurality of relevance scores being for said plurality of question set topics;
receive a relevance score threshold;
determine whether each of said plurality of relevance scores is below said relevance score threshold; and
responsive to said any of said plurality of relevance scores being below said relevance score threshold:
determine said question set topic is unmatched.

8. The computer program product of claim 7, wherein instructions to organize said question set based on said plurality of domain cluster topics to yield a plurality of question set topics comprises instructions to:
receive a semantic index;
analyze said question set based on said semantic index to yield an analyzed question set; and
organize said analyzed question set based on said plurality of domain cluster topics to yield a plurality of question set topics.

9. The computer program product of claim 7, wherein an information retrieval system is implemented responsive to instructions to receive said question set.

10. The computer program product of claim 9, wherein instructions to request enrichment for said document corpus further comprises instructions to:
receive a second question set, said second question set being received responsive to said information retrieval system being implemented; and
update said set of unmatched question set topics.

11. The computer program product of claim 7, wherein instructions to determine whether any of said plurality of question set topics are unmatched yields a plurality of unmatched question set topics.

12. The computer program product claim 11, wherein instructions to request enrichment for said document corpus is based on said plurality of unmatched question set topics.

13. A computer system comprising:
one or more computer processors;
one or more computer readable storage media;
computer program instructions; and
said computer program instructions being stored on said computer readable storage media for execution by at least one of said one or more processors, said computer program instructions comprising instructions to:
receive a question set, said question set being for a question answer system;
receive a plurality of domain cluster topics, said plurality of domain cluster topics being for said question set;
organize said question set based on said plurality of domain cluster topics to yield a plurality of question set topics;
receive a document corpus, said document corpus being for said question answer system;
organize said document corpus based on said plurality of domain cluster topics to yield a plurality of document corpus topics;
map said plurality of question set topics to said plurality of document corpus topics;
determine whether any of said plurality of question set topics are unmatched to said plurality of document corpus topics; and
responsive to any of said plurality of question set topics being unmatched to said plurality of document corpus topics, request enrichment for said document corpus, wherein instructions to request enrichment for said document corpus further comprises instructions to:
receive a relevance score index;
generate plurality of relevance scores, said plurality of relevance scores being for said plurality of question set topics;
receive a relevance score threshold;
determine whether each of said plurality of relevance scores is below said relevance score threshold; and
responsive to said any of said plurality of relevance scores being below said relevance score threshold:
determine said question set topic is unmatched.

14. The computer system of claim 13, wherein instructions to organize said question set based on said plurality of domain cluster topics to yield a plurality of question set topics comprises instructions to:
receive a semantic index;
analyze said question set based on said semantic index to yield an analyzed question set; and
organize said analyzed question set based on said plurality of domain cluster topics to yield a plurality of question set topics.

15. The computer system of claim 13, wherein an information retrieval system is implemented responsive to instructions to receive said question set.

16. The computer system of claim 15, wherein instructions to request enrichment for said document corpus further comprises instructions to:
receive a second question set, said second question set being received responsive to said information retrieval system being implemented; and
update said set of unmatched question set topics.

17. The computer system of claim 13, wherein instructions to determine whether any of said plurality of question set topics are unmatched yields a plurality of unmatched question set topics.

* * * * *